No. 889,251. PATENTED JUNE 2, 1908.
VAN BUREN MARTIN.
RUNNING GEAR FOR VEHICLES.
APPLICATION FILED SEPT. 26, 1907.
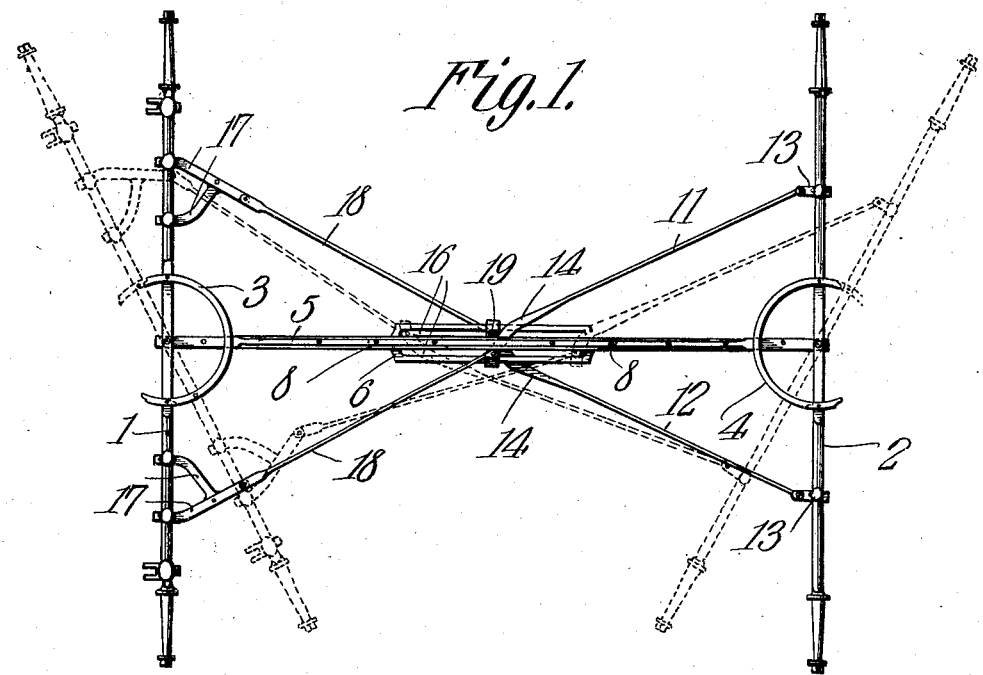
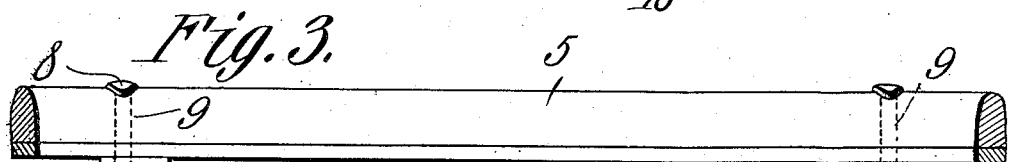
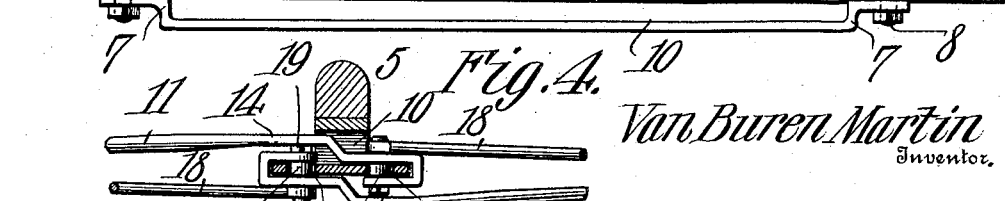
Van Buren Martin
Inventor.
Witnesses
By C.A. Snow & Co
Attorneys

UNITED STATES PATENT OFFICE.

VAN BUREN MARTIN, OF HOPKINSVILLE, KENTUCKY.

RUNNING-GEAR FOR VEHICLES.

No. 889,251.  Specification of Letters Patent.  Patented June 2, 1908.

Application filed September 26, 1907. Serial No. 394,675.

*To all whom it may concern:*

Be it known that I, VAN BUREN MARTIN, a citizen of the United States, residing at Hopkinsville, in the county of Christian and State of Kentucky, have invented a new and useful Running-Gear for Vehicles, of which the following is a specification.

This invention relates to running gear for vehicles of that type known as double swinging or short turning running gear, in which both the front and rear axles are pivoted to swing or oscillate in a horizontal direction whereby an exceedingly short turn of the vehicle with a body suspended between the wheels may be accomplished with ease.

The object of the invention is to provide a vehicle of this type with a simple, strong and effective means for connecting the two axles in such manner that when the front axle is turned in one direction either to the right or left, the rear axle will be caused to swing in the opposite direction.

With these and other ends in view, the invention comprises the various novel features of construction and combination and arrangement of parts, which will be hereinafter more fully described, and set forth particularly in the appended claims.

In the accompanying drawings:—Figure 1 is a plan view of the running gear of a vehicle with the body and wheels removed, showing the mechanism connecting the front and rear axles. Fig. 2 is a top plan view of a guiding plate, the hounds and the connecting bars attached thereto on an enlarged scale. Fig. 3 is a side elevation of the guiding plate showing method of attaching same to the reach bar. Fig. 4 is a transverse section on the line 4—4 of Fig. 2.

Corresponding parts in the several figures are indicated throughout by similar characters of reference.

The front axle is indicated by the numeral 1 and the rear axle by 2, swinging on king bolts and fifth wheels 3, 4 in the usual manner common to the front axles of vehicles. The reach bar 5 extends from the front to the rear axle in the usual manner and is fixed to the non-turning parts of the vehicle. Fastened longitudinally beneath the reach bar 5 is a plate 6 through which are made two long slots parallel to each other and to the reach bar, said plate having on its ends brackets 7 which are bent upwardly a short distance above the upper surface of the plate 6 to bear against the bottom of the reach bar and be fastened thereto by bolts 8 passing through perforations 9 in the bracket and in the reach bar. By thus shaping the brackets 7, a space 10 is formed between the plate 6 and the reach bar the full length of the plate in which the forward end of one of the hounds is placed.

The hounds 11 and 12 are pivoted each to a clip 13 rigidly connected to the rear axle 2 on opposite sides of the reach bar and at a suitable distance therefrom to afford a proper brace for the axle. The hounds are preferably made of round iron for the greater part of their length, but are flattened at their forward ends, as shown at 14. When in normal position, the hounds incline inwardly toward the reach bar midway of its length, their inner ends being bent inwardly to extend transversely across the plate 6, the hound 11 above the plate and the hound 12 below it. After crossing the plate, the flattened ends of the hounds are bent upon themselves to form loops to pass around the sides of the plate 6, the loop on the hound 11 passing beneath the plate while that of the hound 12 extends above it. Pivoted between the folds on the inner end of each hound is a roller 15 extending through a slot 16 in the plate 6 and serving the double purpose of holding the inner ends of the hounds in place and guiding them when the rear axle is swung on its center.

Fastened by clips to the front axle on each side of the reach bar near the thill couplings are two brackets 17 which project rearwardly from said front axle and have pivoted thereto connecting rods 18 one from each bracket to a hound. The connecting rod 18 on one side of the reach bar 5 is pivoted to the hound that extends to the rear axle on the opposite side of the reach bar, thus forming a cross connection. The connection between the two is made by forming an eye in the end of the connecting rod and passing the pivot bolt of the roller 15 through it and securing it by a nut 19.

As thus constructed, when the front axle is turned to the right or left, one of the connecting rods 18 will be drawn forward and the other will be pushed in a backward direction. A forwardly moving rod 18 which is attached to the hound on the opposite side of the reach bar will draw said hound forwardly, and the rear axle on that side will naturally follow in the same direction. The rearwardly moving connecting bar will, of course, move the other hound in the same direction and through it the axle. This will cause the axles to turn to the position indicated by dotted lines in Fig. 1 and permit the vehicle to make a very short turn. It will be observed that by placing the inner end of one of the hounds above the plate 6, and the other below the said plate, each hound may pass from one end of its slot connection to the other, the parts crossing without interfering.

This mechanism may be applied to a great variety of vehicles at a small cost and with slight trouble as to construction, the greatest change required being, of course, to pivot the rear axle. The construction is strong, is not disfiguring, and adds to the value and convenience of side bar vehicles and others where front wheels are not able to "cut under" when making a turn.

While rollers only have been described as connected to the forward ends of the hounds and extend through the slots in the plate 6, it is to be understood that any other suitable means may be employed to serve as guides in place of the rollers, such as bolts, plates, blocks, et cetera, and therefore, such means are to be considered as equivalents.

What is claimed is:—

1. A running gear for vehicles comprising a pivoted front and rear axle, hounds pivoted to said rear axle, a guide plate fixed to the center of the reach bar to which said hounds are slidably connected, and connecting rods pivoted near opposite ends of the front axle, and attached each to the hound on the opposite side of said reach bar.

2. A running gear for vehicles comprising a swinging front and rear axle, a hound pivotally attached near each end of said rear axle and inclining toward the center, a guide plate fixed beneath the reach bar of a vehicle at its longitudinal center and having a longitudinal slot on each side of said reach bar, one of said hounds arranged to pass between said reach bar and the top of said plate and fold beneath it, and the other hound extending beneath said plate with its end folded above the same, and a connecting bar cross pivoted to each hound and to the front axle.

3. A running gear for vehicles comprising a swinging front and rear axle, a hound pivotally attached near each end of said rear axle, a guide plate fixed to the reach bar by end brackets leaving a space between said reach bar and the plate, one of said hounds passing above said reach bar and folded beneath it, the other hound passing beneath said bar and turned over the top of said plate, guide pulleys carried by the folded ends of the hounds and adapted to travel longitudinally each in a slot formed in said guide plate, and connecting bars pivoted to said hound and to the front axle.

4. A running gear for vehicles comprising a pivotal front and rear axle, a longitudinally slotted guide plate fixed to the underside of the reach bar, a hound pivotally fastened near each end of the rear axle and extending toward said plate one above and the other below the same, a guide roller carried by each hound and adapted to slide in one of the slots in said plate, a bracket attached to the front axle near each end, and a connecting bar pivoted to each bracket and to the hound on the opposite side of said reach bar.

In testimony that I claim the foregoing as my own, I have hereto affixed my signature in the presence of two witnesses.

VAN BUREN MARTIN.

Witnesses:
 Ed J. Duncan,
 J. P. Meacham.